United States Patent [19]

Wallace

[11] 4,231,388
[45] Nov. 4, 1980

[54] GATE FOR USE IN A GATE VALVE

[76] Inventor: Charles C. Wallace, 7833 NE. Tillamook, Portland, Oreg. 97213

[21] Appl. No.: 878,705

[22] Filed: Feb. 17, 1978

[51] Int. Cl.³ ............................................. F16K 3/02
[52] U.S. Cl. ................................. 137/242; 164/228; 249/175; 251/327
[58] Field of Search ...................... 251/326, 327, 175; 137/237, 238, 239, 242, 244

[56] References Cited

U.S. PATENT DOCUMENTS

| | | | |
|---|---|---|---|
| 2,214,194 | 9/1940 | Frankley | 251/175 X |
| 2,645,244 | 7/1953 | Klickman | 137/238 X |
| 2,816,729 | 12/1957 | Jensen | 251/175 X |
| 3,256,897 | 6/1966 | Carlton | 251/327 X |

*Primary Examiner*—Martin P. Schwadron
*Assistant Examiner*—Richard Gerard
*Attorney, Agent, or Firm*—Kolisch, Hartwell & Dickinson

[57] ABSTRACT

A novel gate for use in a gate valve is provided with a cylindrical port which extends from the gate's upstream face to a downstream face. Sand grooves are provided on each face and passages extending in a radial direction from the port's cylindrical wall to the grooves are also provided. The passages are thus aligned with their longitudinal axes being generally perpendicular to the direction of fluid flow which enhances flushing of particles such as sand or scale from the grooves. A novel shell core and core box for making same are also disclosed.

7 Claims, 9 Drawing Figures

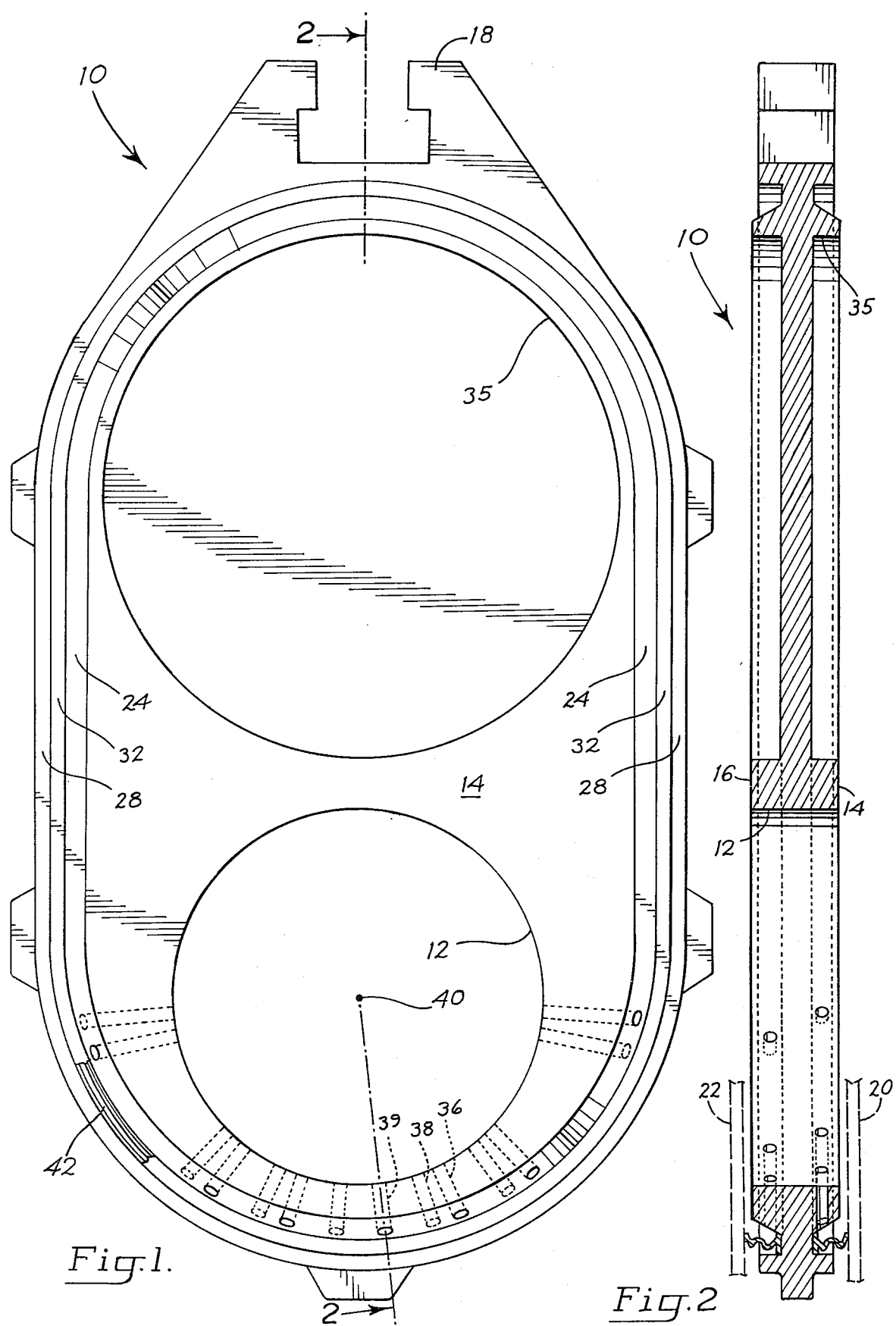

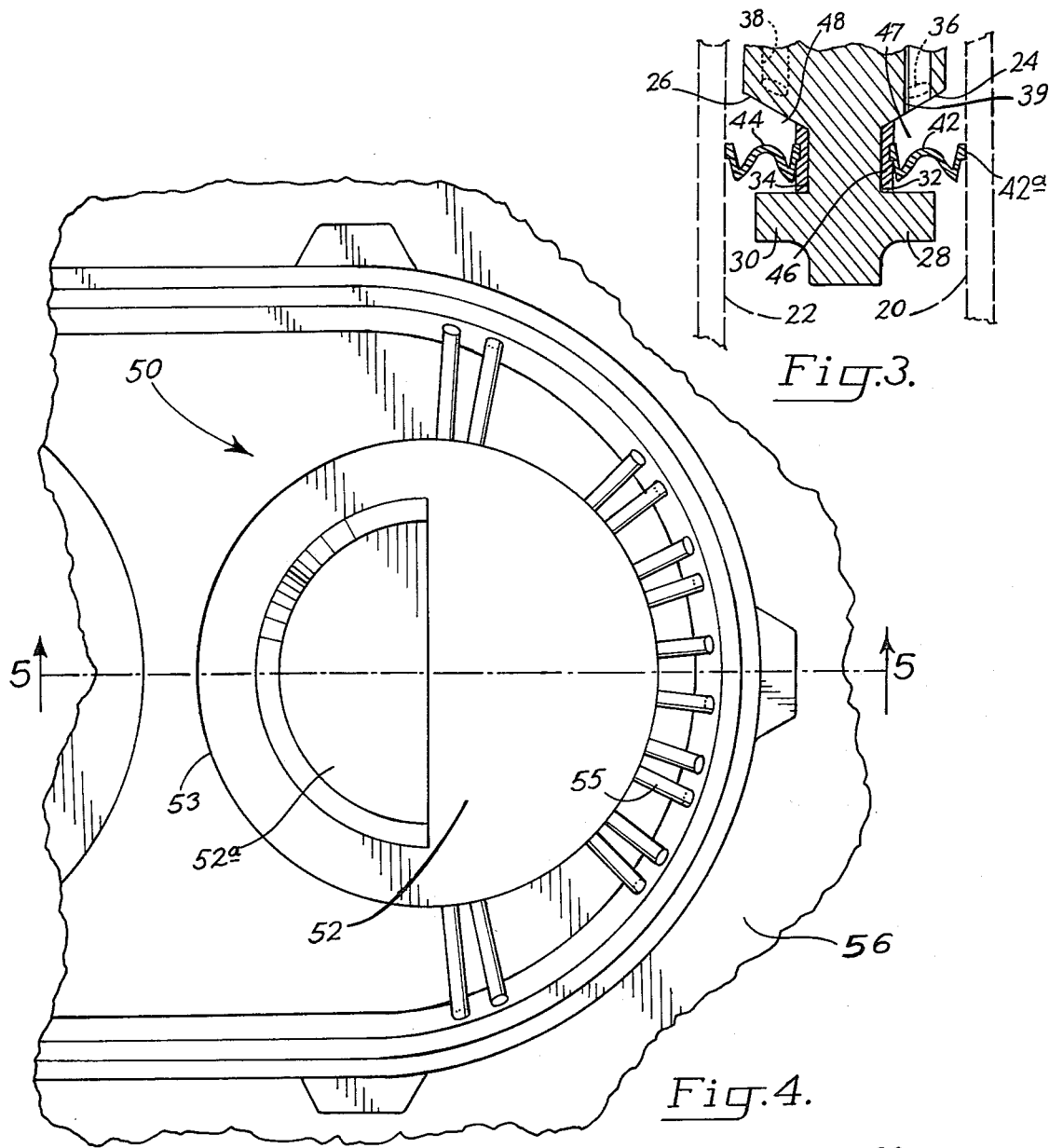
Fig. 3.
Fig. 4.
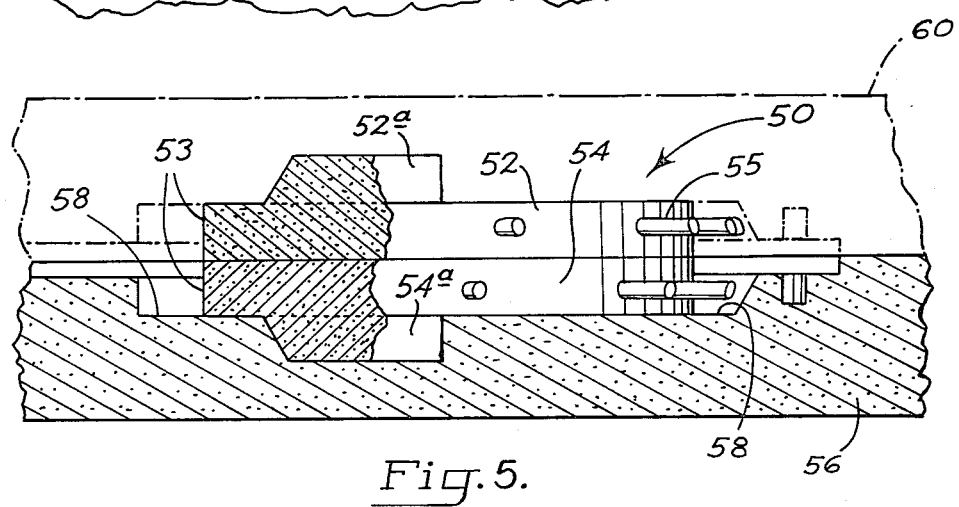
Fig. 5.

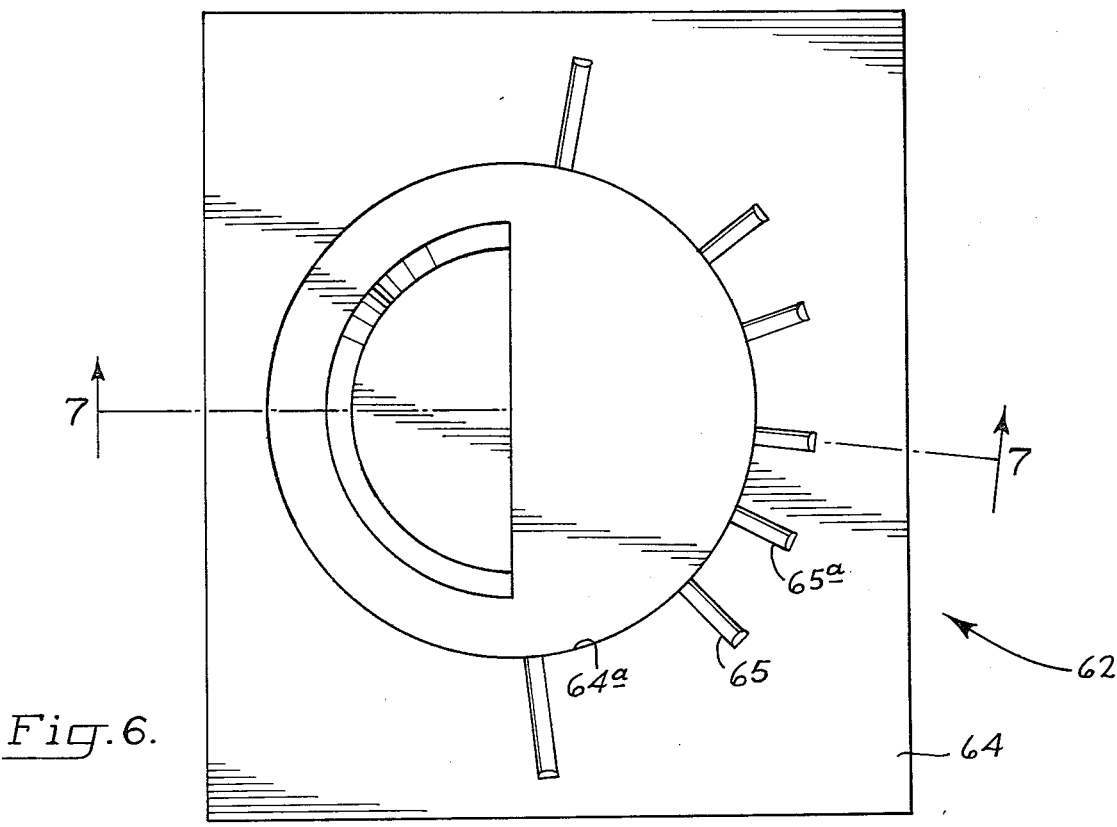
Fig. 6.
Fig. 7.
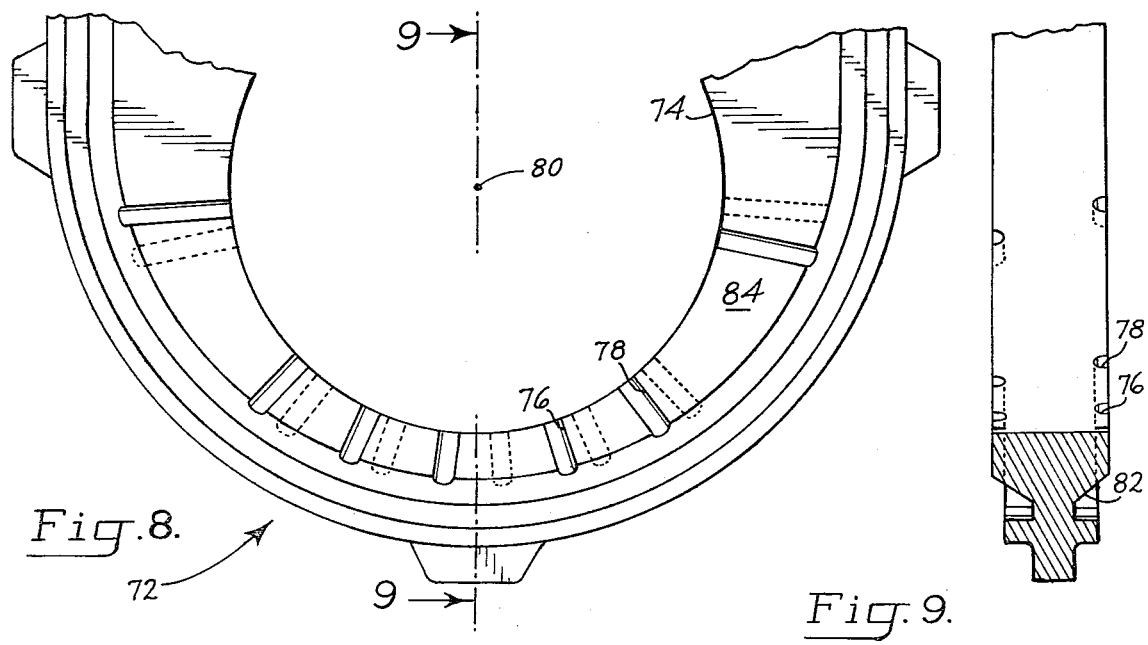
Fig. 8.
Fig. 9.

GATE FOR USE IN A GATE VALVE

BACKGROUND AND SUMMARY OF THE INVENTION

The present invention relates to gate valves and more particularly to a novel gate for use in the valve having passages for flushing scale material from a valve housing back into a flow stream. In addition, the present invention is directed to a novel shell core use in fabricating a gate port and a method of making the shell core.

Gate valves having through ports are commonly used in conjunction with fluid conducting pipes in order to regulate fluid flow therethrough. A typical gate valve includes a housing within which a gate is operable for selective shifting to present either the port or an obstruction to fluid flow. It is known that continued use of a gate valve may result in an accumulation of corrosive particles such as sand or scale between upstream and downstream faces of the gate and corresponding walls of the housing. The accumulation of particles may result in impaired operation of the gate valve. It has therefore been proposed to mount a "scale ring" within marginal sand grooves on the upstream and downstream faces of the gate for sliding contact with the walls of the housing. The sliding contact results in an abrading or scraping off of the particles into cavities between the scale ring and a bottom portion of the grooves.

In order to transfer or flush the accumulated particles back into a fluid flow for downstream removal, it has been proposed to provide passages extending from the peripheral wall of the gate's through port into the cavities where the particles have accumulated. Fluid flow through the port tends to create a partial vacuum adjacent the opening of the passages into the port thereby drawing the particles upwardly for discharge into the fluid stream.

However, a problem exists in fabricating the passages in a gate. For instance, the prior art contemplates drilling of the passages in a gate which has already been cast. Unfortunately, it is generally not possible to drill passages so that they extend radially outwardly from the cylindrical axis to the grooves. This is because ports generally are not sized sufficiently large enough to permit insertion of a drill for boring. As a consequence, boring or drilling must be directed at an angle which results in a longer passage inclined relative the peripheral wall of the port in a nonradial direction.

Accordingly, it is a general object of the present invention to provide a gate for use in a gate valve in which the gate includes passages extending in a radial direction from the cylindrical axis of the port to the grooves. This results in the passages having their longitudinal axes perpendicular to liquid flow and the effect is greater turbulence adjacent the opening of the passages into the cylindrical wall of the port. The turbulence results in a greater vacuum being produced thereby facilitating flushing out of the particles from the bottom of the grooves.

Another object of the present invention is to provide a shell core of novel construction which may be advantageously employed in the casting of a gate. The shell core includes core body sections each including elongate projections which, when mounted in gate molds, will enable the casting of a gate having the radially extending passage construction as described above.

Still another object of the present invention to provide a novel core box construction for fabricating the shell core described above.

These and additional objects and advantages of the present invention will become more readily apparent from a consideration of the drawings and the following detailed description of the preferred embodiments.

BRIEF DESCRIPTION OF THE DRAWINGS

FIG. 1 is a front elevation view directed toward a face of a gate constructed according to the present invention;

FIG. 2 is a cross-sectional view of the gate of FIG. 1 taken along lines 2—2 showing bottom portions of a gate valve housing in dot-dash;

FIG. 3 is an enlarged cross-sectional view of a bottom portion of the gate;

FIG. 4 is a top plan view of a shell core according to the present invention mounted in a bottom mold for a gate;

FIG. 5 is a cross-sectional view of the mold of FIG. 4 taken along lines 5—5 of FIG. 4 and illustrates positioning of the shell core;

FIG. 6 is a top plan view of a core box in accordance with the present invention for fabricating the shell core;

FIG. 7 is a view taken along lines 7—7 of FIG. 6;

FIG. 8 is a partial view of the lower half of a second embodiment of the present invention; and FIG. 9 is a cross-sectional view taken along lines 9—9 of FIG. 8.

DETAILED DESCRIPTION OF THE PREFERRED EMBODIMENTS

Turning now to the drawings, and with reference initially directed to FIGS. 1 and 2, a gate for use in a gate valve according to the present invention is generally indicated at 10. Gate 10 includes a cylindrical port 12 which extends through the gate's thickness, defined as the distance between an upstream side or face 14 and a downstream side or face 16. While faces 14, 16 have been labeled as upstream, downstream respectively, it must be remembered that this is only in reference to the direction of fluid flow.

As is conventional, an upper portion of gate 10 is provided with a suitable flange construction, indicated at 18 for connection to a mechanism operable for sliding the gate upwardly or downwardly within a gate valve housing. Bottom portions of a housing are represented by walls 20, 22 shown in dot-dash in FIG. 2. As is also conventional, face 14 is provided with a beveled periphery 24 and face 16 with a beveled periphery 26. (See FIGS. 2, 3). Further, each side of the gate is provided with a rim such as rim 28 shown in FIG. 1. The other side of gate 10 includes a rim 30 shown in FIG. 2. A continuous marginal sand groove such as indicated at 32 is defined between beveled periphery 24 and rim 28. Likewise, a marginal sand groove 34 is defined between beveled periphery 26 and rim 30. Each of the marginal sand grooves is provided for accommodating mounting of a scale ring, details of which will be discussed at a later point. Circular recesses above port 12 such as indicated at 35 are provided for mounting a sealing member (not shown) on each side of the gate.

With reference still directed to FIGS. 1 and 2, it can be seen that the present invention contemplates the use of a novel channel means such as holes or passages 36, 38, 39, etc. which extend in a radial direction from the port's cylindrical wall to the grooves. More particularly, it can be seen that passage 36 is an elongate, hollow cylinder having its longitudinal axis lying on a radial line extending from the cylindrical axis, indicated at 40, of port 12. Passage 36 (see also FIG. 3) extends from the cylindrical wall of port 12 outwardly through bevel 24. Similarly, passage 38 is an elongate, hollow cylinder having a longitudinal axis which lies on a radial line extending from cylindrical axis 40 outwardly through level 26. Passage 36, along with the other passages extending into groove 32, are referred to as a first array. The other passages, such as passage 38 extending into groove 34, constitute a second array.

As mentioned previously, gate 10 of the present invention is provided with a scale ring mounted in each groove 32, 34. A complete scale ring is not shown in FIG. 1 so that other details may be presented; however portions of scale rings are shown in FIGS. 2 and 3. Specifically, as shown in FIG. 3, a scale ring 42 is mounted in groove 32 and a scale ring 44 mounted in groove 34. Each scale ring extends throughout the length of its associated groove and is appropriately secured along its inside edge by means of adhesive to the groove. For instance, as shown in FIG. 3, scale ring 42 has its inside edge secured by means of an adhesive 46 to the face of groove 32. Scale ring 44 is similarly secured, and it is to be noted that each of the scale rings is provided with a warped contour intermediate its edges as illustrated. The warped contour gives rigidity to a scale ring and also serves to bias the outer edge of the scale ring toward its associated wall in the valve housing. More particularly, it can be seen that scale ring 42 is mounted within the valve housing so that outer perimetrical edge 42a is urged against the inner face of housing wall 20. Scale ring 44 is similarly mounted, and upon vertical shifting of gate 10, the outer edges of the scale rings will abrade or scrape material from the inner faces of the housing walls. The material will tend to accumulate in cavities 47, 48 for eventual discharge upwardly through passages 36, 38, etc.

At this point, it must be noted that the positioning of passages 36, 38, etc. in a radial direction from cylindrical axis 40 provides significant advantages. To elaborate, it can be appreciated that fluid flow through port 12 will progress in a direction perpendicularly to the longitudinal axes of each of the passages. The fluid flow (such as a liquid being transported through the port) will tend to create turbulence adjacent each passage's opening in the cylindrical wall of port 12. This will produce a partial vacuum tending to draw material from cavities 47, 48 upwardly through the passages for discharge downstream. To create maximum turbulence, it has been found important to position the passages with their longitudinal axes perpendicular to the direction of flow. It is to be remembered, however, that prior art passages have not been radially directed but rather have been positioned at an angle. The present invention specifically contemplates the radial positioning of the passages for increased efficiency in drawing or flushing of material or particles from the cavities outwardly through the passages. In order to cast a valve with radially extending passages as described above, the present invention also contemplates a novel shell core construction and core box for fabricating the shell core.

With reference now directed to FIGS. 4 and 5, details of the novel shell core construction will be described. It is necessary to provide a special shell core in order to cast gate 10 with the radially extending passages as illustrated. The problem in casting the gate resides in the fact that the passages are embedded beneath the faces of the gate, and thus do not permit ready formation in a typical casting process. Rather, a novel shell core construction must be provided in order to facilitate gate casting.

To this end, it is contemplated that a shell core constructed of two sections be positioned together in gate molds. For instance, as shown in FIG. 5, a shell core generally indicated at 50 includes a core body having sections 52, 54 and keys 52a, 54a. Each of the sections is formed as a cylinder having an outer periphery (such as shown at 53) generally defining the peripheral circumference of the opening or port in the gate to be cast. Each section also includes an array of elongate means such as indicated at 55 which extend in a radial direction and provide a solid cylinder for defining the channel means or passages to be formed during casting. A bottom mold is indicated at 56 and is provided with an outline, generally indicated at 58, formed by a gate pattern in a known manner. Shell core 50, including assembled sections 52, 54 is mounted in molding 56 so that key 54a is mated with an associated key in the bottom mold. This orients the elongate means in a preselected manner, and an upper molding 60 may then be positioned over shell core 50 as indicated in dot-dash outline in FIG. 5. Molten casting material is then transferred through a suitable conduit (not shown) into the cavity formed between the molds in conventional manner. After the material has solidified, the molds are separated and shell core 50 along with the elongate means may be deleted from the gate casting. The result is a port within the gate having passages which extend in a radial direction as described above.

Another problem resides in fabricating a shell core, or more particularly shell core sections as described above. The present invention also contemplates a novel core box construction for use in fabricating a shell core having projections such as the array of elongate means described with reference to FIGS. 4 and 5. Specifically, and referring to FIGS. 6 and 7, a novel core box is indicated generally at 62 and is referred to as a "split core box". Specifically, core box 62 includes a pair of separable molds each being provided with a pattern for a portion of one of the sections and a portion of the elongate means of the shell core. As shown in FIG. 7, core box 62 includes a bottom mold 64 provided with a pattern 64a for a portion of a shell core section patterns 65, 65a, etc. for a portion of the elongate means. An upper mold 66, indicated in dot-dash, is provided with a similar pattern for the other side of a shell core section. With core box 62 assembled as shown in FIG. 7, it can be seen that the molds are joined or matched along a plane 67 which substantially equally divides an array of projection cavities such as indicated at 68. A core section cavity is indicated at 70 and when core material such as sand provided with a phenolic resin binder is introduced into cavity 70, the sand will also be forced into the projection cavities. Core box 62 is placed in an oven and the sand is baked in order to achieve a predetermined hardness. After baking, section 66 is separated from section 64 and then section 64 is separated from the shell core section. A shell core section having elongate means radially extending from the section's cylindrical axis is thereby provided. Of course, it takes two of the shell core sections to form the shell core shown in FIG. 5.

With the above core box construction, it can be readily appreciated that it is a simple matter to provide a shell core having elongate means radially extending from a core body section. While it has been described that projection cavities 68 be filled with sand, it should be understood that metallic pins, such as carbon rods, may be placed in the projection cavities and sand used to fill cavity 70.

A second embodiment of a gate according to the present invention is shown in FIG. 8. Only a bottom portion of a gate, generally indicated at 72, is shown. Gate 72 is provided with a cylindrical port 74 from which extend a plurality of passages. For instance, passages 76, 78, etc. extend in a radial direction from the port's cylindrical axis, generally indicated at 80. In this embodiment, the passages are arrays of elongate recesses which are provided in the upstream and downstream faces of gate 72. As can be seen in FIG. 8, passages 76, 78 extend from the cylindrical wall of port 74 to a bevel 82 along a face 84 of the gate. Similarly, elongate recesses are provided on the other or downstream face of gate 72.

It is noted that the elongate recesses may be either machined or cast in the gate, and it is not necessary to provide a shell core or core box construction as described with reference to the first embodiment. However, it is to be noted that the embodiment shown in FIGS. 8 and 9 nonetheless contemplates that the passages are positioned to extend in a radial direction from the cylindrical axis of the port.

In conclusion, it should be appreciated that the present invention provides a gate having a construction providing significant advantages. The channel means or passages for conducting or flushing residue or scale material from the sand grooves are positioned to extend in a radial direction from the port's cylindrical axis. This results in a passage positioned perpendicularly to the direction of fluid flow through the port and turbulence adjacent the passage opening in the port's cylindrical wall in increased. A stronger vacuum results adjacent the opening for providing more flushing action through the passages. The vacuum serves to pull particles from the sand groove for removal of the particles in the direction of fluid flow.

Another advantage of the present invention resides in the use of the novel shell core construction which includes elongate means extending radially outwardly from a pair of core body sections. The core body sections are generally cylindrical and each defines one half of a port in a gate to be cast. With two core body sections assembled within a gate molds to define a shell core, molten material may be formed around the shell core and the elongate means. Upon hardening of the material, the molds may be removed and the core body and elongate means knocked out. Thus, the novel shell core of the present invention enables casting of passages extending in a radial direction from the cylindrical wall of a port. The passages are aligned with their longitudinal axes lying on radial lines extending from the port's cylindrical axis. It should be apparent that complicated and time-consuming drilling is not required.

Still another advantage of the present invention resides in the novel core box construction utilized for fabricating the shell core. By use of separable components or molds, a pattern for the shell core may be provided which contemplates projection cavities extending from a core cavity. The molds are separable so that a shell core section having elongate means may be formed.

While the invention has been particularly shown and described with reference to the foregoing preferred embodiments thereof, it will be understood by those skilled in the art that other changes in form and detail may be made therein without departing from the spirit and scope of the invention as defined in the appended claims.

It is hereby claimed and desired to secure by Letters Patent:

1. For use in a gate valve, a gate having upstream and downstream faces, a port defined by a cylindrical wall having a cylindrical axis extending through the gate's thickness and a marginal groove provided on each face, each groove being in open communication with its associated face during normal valving operation for collecting foreign material therein, the improvement comprising:

channel means formed in the gate extending along a radius from the cylindrical axis for providing a passage between the cylindrical wall and at least one of the grooves.

2. The gate of claim 1 wherein said channel means includes an elongate passage.

3. The gate of claim 1 wherein said channel means includes a first array of elongate passages extending into one of said grooves and a second array of elongate passages extending into the other groove.

4. The gate of claim 3 wherein a scale ring is mounted in each of said grooves, said scale ring being formed with a warped contour along at least a portion of its length.

5. The gate of claim 1 wherein said channel means includes an elongate recess extending along at least one of said faces.

6. The gate of claim 5 wherein said channel means includes a first array of elongate recesses extending into one of said grooves and a second array of elongate recesses extending into the other groove.

7. The gate of claim 6 wherein a scale ring is mounted in each of said grooves, said scale ring formed with a warped contour along at least a portion of its length.

* * * * *